US007253253B2

(12) United States Patent
Bohnert et al.

(10) Patent No.: US 7,253,253 B2
(45) Date of Patent: Aug. 7, 2007

(54) METHOD OF REMOVING CONTAMINANTS FROM PLASTIC RESINS

(75) Inventors: George W. Bohnert, Harrisonville, MO (US); Thomas E. Hand, Lee's Summit, MO (US); Gary M. Delaurentiis, Jamestown, CA (US)

(73) Assignee: Honeywell Federal Manufacturing & Technology, LLC, Kansas City, MO (US)

( * ) Notice: Subject to any disclaimer, the term of this patent is extended or adjusted under 35 U.S.C. 154(b) by 0 days.

(21) Appl. No.: 11/096,880

(22) Filed: Apr. 1, 2005

(65) Prior Publication Data

US 2006/0223980 A1 Oct. 5, 2006

(51) Int. Cl.
*C08F 6/00* (2006.01)
(52) U.S. Cl. ............... 528/480; 422/131; 528/125; 528/176; 528/495
(58) Field of Classification Search ............... 422/131; 528/125, 176, 480, 495
See application file for complete search history.

(56) References Cited

U.S. PATENT DOCUMENTS

| 4,379,525 | A |   | 4/1983  | Nowicki et al. |
|-----------|---|---|---------|----------------|
| 4,543,364 | A |   | 9/1985  | Nankee et al. |
| 4,578,184 | A |   | 3/1986  | Rasmussen |
| 4,680,060 | A |   | 7/1987  | Gupta et al. |
| 4,714,526 | A |   | 12/1987 | Pennisi et al. |
| 4,746,422 | A |   | 5/1988  | Grimm |
| 4,918,160 | A | * | 4/1990  | Kondoh et al. ............ 528/483 |
| 4,919,816 | A | * | 4/1990  | Tsao ............ 210/638 |
| 4,959,232 | A | * | 9/1990  | Underwood ............ 426/271 |
| 5,009,746 | A |   | 4/1991  | Hossain et al. |
| 6,011,087 | A |   | 4/1991  | Marshall et al. |
| 5,013,366 | A |   | 5/1991  | Jackson et al. |
| 5,049,647 | A |   | 9/1991  | Al-Ghatta |
| 5,073,203 | A |   | 12/1991 | Al-Ghatta |
| 5,080,845 | A |   | 1/1992  | Herrmann et al. |
| 5,110,055 | A |   | 5/1992  | Teeny |
| 5,115,987 | A |   | 5/1992  | Mithal |
| 5,126,058 | A |   | 6/1992  | Beckman |
| 5,148,993 | A |   | 9/1992  | Kashiwagi |
| 5,160,441 | A |   | 11/1992 | Lundquist |
| 5,185,041 | A |   | 2/1993  | Anderson et al. |
| 5,233,021 | A |   | 8/1993  | Sikorski |
| 5,252,614 | A |   | 10/1993 | Sisson |
| 5,258,491 | A | * | 11/1993 | Agreda et al. ............ 528/495 |
| 5,270,067 | A | * | 12/1993 | Underwood et al. ........ 426/138 |
| 5,271,773 | A |   | 12/1993 | Hamilton et al. |
| 5,279,615 | A |   | 1/1994  | Mitchell et al. |
| 5,290,505 | A |   | 3/1994  | Huber et al. |
| 5,294,263 | A |   | 3/1994  | Riso |
| 5,304,253 | A |   | 4/1994  | Grant |
| 5,316,591 | A |   | 5/1994  | Chao et al. |
| 5,330,581 | A |   | 7/1994  | Syrinek |
| 5,339,844 | A | * | 8/1994  | Stanford |
| 5,370,742 | A |   | 12/1994 | Mitchell et al. |
| 5,401,322 | A |   | 3/1995  | Marshall |
| 5,456,759 | A | * | 10/1995 | Stanford, Jr. et al. |
| 5,462,973 | A |   | 10/1995 | Serad et al. |
| 5,467,492 | A | * | 11/1995 | Chao et al. |
| 5,533,538 | A |   | 7/1996  | Marshall |
| 5,558,913 | A |   | 9/1996  | Sasaki et al. |
| 5,651,276 | A | * | 7/1997  | Purer et al. |
| 5,669,251 | A | * | 9/1997  | Townsend et al. |
| 5,711,820 | A |   | 1/1998  | Smith et al. |
| 5,739,270 | A |   | 4/1998  | Farmer et al. |
| 5,756,657 | A |   | 5/1998  | Sawan et al. |
| 5,780,520 | A |   | 7/1998  | Reeves et al. |
| 5,784,905 | A | * | 7/1998  | Townsend et al. |
| 5,822,818 | A | * | 10/1998 | Chao et al. |
| 5,858,022 | A | * | 1/1999  | Romack et al. |
| 5,858,107 | A | * | 1/1999  | Chao et al. |
| 5,925,192 | A | * | 7/1999  | Purer et al. |
| 6,200,352 | B1 | * | 3/2001 | Romack et al. |
| 6,200,943 | B1 | * | 3/2001 | Romack et al. |
| 6,212,916 | B1 | * | 4/2001 | Carr |
| 6,248,136 | B1 | * | 6/2001 | McClain et al. |
| 6,258,766 | B1 | * | 7/2001 | Romack et al. |
| 6,260,390 | B1 | * | 7/2001 | Carr |
| 6,287,640 | B1 | * | 9/2001 | McClain et al. |
| 6,297,206 | B2 | * | 10/2001 | Romack et al. |
| 6,306,222 | B1 |   | 10/2001 | Kim et al. |
| 6,312,528 | B1 |   | 11/2001 | Summerfield et al. |
| 6,369,192 | B1 |   | 4/2002  | Dufresne et al. |

(Continued)

FOREIGN PATENT DOCUMENTS

| DE | 4029720 | 4/1990 |
| EP | 359106  | 3/1990 |
| EP | 0492043 | 7/1992 |
| EP | 521418  | 1/1993 |
| EP | 538730  | 4/1993 |
| WO | 92-9413 | 6/1992 |

OTHER PUBLICATIONS

"Design for Recycling Guidlines", Association of Post-consumer Plastic Recyclers, Washington, DC, 2006.
"Plastic Recycling Process Improved", NC State researchers Developing Unique Technology, http://www.engr.ncsu.edu/news/news_articles/roberts.html, Apr. 3, 2003.
Operation Enterprise, Plastic Recycling Company to Move Into Riverbank Industrial Comples, pp. 1-4, Fall 2004, Independence, MO.
Food Production Daily, Amcor Invests Heavily to Expand PET Recycling Capabilities, pp. 1-3, Jan. 27, 2003, Europe.

*Primary Examiner*—Terressa Boykin
(74) *Attorney, Agent, or Firm*—Hovey Williams LLP

(57) ABSTRACT

A method for removing contaminants from synthetic resin material containers using a first organic solvent system and a second carbon dioxide system. The organic solvent is utilized for removing the contaminants from the synthetic resin material and the carbon dioxide is used to separate any residual organic solvent from the synthetic resin material.

29 Claims, 2 Drawing Sheets

U.S. PATENT DOCUMENTS

| | | |
|---|---|---|
| 6,402,857 B2 | 6/2002 | Clark et al. |
| 6,536,059 B2 * | 3/2003 | McClain et al. |
| 6,554,005 B1 | 4/2003 | Cords et al. |
| 6,616,770 B2 | 9/2003 | Musha et al. |
| 6,755,871 B2 | 6/2004 | Damaso et al. |
| 6,770,680 B2 | 8/2004 | Klenk |
| 6,919,383 B2 | 7/2005 | Khan et al. |
| 6,938,439 B2 * | 9/2005 | Wikstrom et al. |
| 2001/0000001 A1 | 3/2001 | Clark et al. |
| 2002/0033550 A1 | 3/2002 | Suehara |
| 2002/0045730 A1 | 4/2002 | Yanagida |
| 2002/0048629 A1 | 4/2002 | Romack et al. |
| 2002/0189644 A1 | 12/2002 | Wack |
| 2003/0199596 A1 | 10/2003 | Koike et al. |
| 2003/0213747 A1 | 11/2003 | Carbonell et al. |
| 2003/0217765 A1 | 11/2003 | Masuda et al. |
| 2004/0079294 A1 | 4/2004 | Thouvenot et al. |
| 2006/0005572 A1 | 1/2006 | WIkstrom et al. |

* cited by examiner

METHOD OF REMOVING CONTAMINANTS FROM PLASTIC RESINS

GOVERNMENT SPONSORED DEVELOPMENT

The U.S. Government has rights in this invention pursuant to contract number DE-ACO4-01AL66850 with the United States Department of Energy.

BACKGROUND OF THE INVENTION

1. Field of the Invention

The present invention relates to an improved method and system for removing contaminants from synthetic resin (especially plastic) materials. More particularly, the invention relates to a two-part method for removing contaminants from synthetic resin materials comprising an upstream solvent cleaning system and a downstream carbon dioxide cleaning system.

2. Description of the Prior Art

Recycling containers made from synthetic resin material is a highly desirable alternative to landfilling such containers. However, these containers often include residues of the material they once contained. These residues if not removed can decrease the value of the container material making it suitable for only low-grade products. Traditionally, these residues or contaminants have been difficult and expensive to remove and prone to create additional waste byproducts.

Recycling of motor oil containers is illustrative of the problem. Motor oil containers typically are high-density polyethylene (HDPE) which lends itself well to recycling if it is sufficiently clean. However, residual oil coating the interior surface of the "empty" motor oil containers constitutes a contaminant that prevents use of the containers in high grade plastics. Based upon measurement of samples of used motor oil containers, this residual oil coating appears to average 4.6 percent of the weight of the used synthetic resin material container and can represent as much as 20 percent of the container weight. The vast majority of these containers are currently disposed of in landfills, leaking oil into the soil and groundwater, and occupying significant landfill volume. However, if the motor oil could be easily separated from the containers, much of this landfill volume and soil and groundwater pollution could be avoided.

Current available options to landfilling the waste synthetic resin containers include (a) grinding the containers and using them in other recycling processes on a very limited (dilute) basis; (b) using an aqueous process to displace the contaminant from the synthetic resin material; (c) using a halogenated solvent to dissolve/dilute the contaminant; or (d) using a combustible or flammable solvent to dissolve/dilute the contaminant oil from the synthetic resin material.

The problems with these options are as follows:

a. Existing recyclers in the United States can blend limited quantities of contaminated synthetic resin materials in recycled products. Large quantities cannot be blended because of the undesirable effects of the contaminants on the recycled synthetic resin material properties. Examples include "plastic lumber" and lower grade plastic products.

b. Aqueous processes can be used to displace the contaminants from the synthetic resin material. However, detergents and/or surfactants are required to assist displacement of the contaminants. A stream of usable contaminant-free synthetic resin material will be generated by this method; however, the displaced contaminants will need additional processing to separate them from the aqueous solutions or dispersions. The aqueous solutions or dispersions themselves will be a secondary waste stream that will require treatment before being recycled or discharged as waste water.

c. Halogenated solvents can be used to dissolve/dilute the contaminants from the synthetic resin material. Again, usable synthetic resin material will be obtained by this process if the solvents do not extract essential components from the synthetic resin material. The halogenated solvent solutions will require distillation to recover the contaminants and recycle the solvents. In general, it is difficult to fully reclaim usable contaminants (such as oil) from the distillate. Furthermore, many halogenated solvents are ozone depleting compounds and potential health hazards to humans, and therefore their use and release into the environment are under regulation and close scrutiny by federal and state governments.

d. Combustible or flammable solvents may be used to dissolve and/or displace the contaminants from the synthetic resin material. Usable synthetic resin material can be generated by this method if the solvents do not extract essential components from the synthetic resin material. The combustible or flammable solvent solutions will require distillation to recover the contaminants and recycle the solvents. Only distillation equipment suitable for combustible or flammable solvents may be used and even then fire safety concerns will be significant. As in the case of the use of halogenated solvents, the contaminant may not be fully recoverable from the distillation.

The present methods described above can provide some usable synthetic resin material from oil contaminated containers. However, they will recover usable oil only at the expense of a secondary waste stream that itself will require treatment and additional expense. The recycling of synthetic resin material and oil from "empty" oil containers presents serious environmental and waste stream disposal problems if conventional organic or aqueous solvents are used for the separation of the synthetic resin material and oil. Discarding of the containers as landfill waste also presents environmental problems in that the residual oil may eventually leach into soil and groundwater.

U.S. Pat. No. 5,711,820 describes a method of separating oil from plastic contaminated with oil using liquid or supercritical carbon dioxide. However, the ability of the carbon dioxide to solvate the oil is relatively low. To be effective, the carbon dioxide must be placed under very high pressure. As a result, not only must the system equipment be designed for high pressure operations, but the utility costs in providing the high pressure carbon dioxide can also be sizeable.

Accordingly, there is a need for an improved system and method for removing contaminants from synthetic resin material containers. More particularly, there is a need for a system and method that will produce essentially contaminant-free synthetic resin material in an environmentally safe and economical manner.

SUMMARY OF THE INVENTION

The present invention solves the above-described problems and provides a distinct advance in the art of contaminant removal from synthetic resin materials. As used herein, the term "synthetic resin materials" includes, but is not limited to, plastic materials. More particularly, the present invention provides a method for removing contaminants from synthetic resin material comprising contacting particulate synthetic resin material containing at least one contaminant with an organic solvent comprising at least one carbon atom and at least one hydrogen atom and having a specific gravity of at least about 0.76.

In another aspect, the present invention provides a method for removing contaminants from synthetic resin material comprising contacting particulate synthetic resin material containing at least one contaminant with an alkyl ester solvent having the general formula RCOOR', wherein R and R' are independently selected from C1-C10 alkyl groups and R contains at least one hydroxyl group.

In yet another aspect, the present invention provides a method for removing contaminants from synthetic resin material comprising the steps of: (a) contacting particulate synthetic resin material containing at least one contaminant with a solvent other than carbon dioxide; (b) removing at least a portion of the solvent from the particulate synthetic resin material; and (c) contacting the particulate synthetic resin material with liquid or supercritical carbon dioxide for removal of at least a portion of the solvent not removed in step (b).

In still another aspect, the present invention provides a system for removing contaminants from synthetic resin material comprising: (a) at least one solvent vessel including therein a quantity of a liquid solvent other than carbon dioxide for contacting with the synthetic resin material; (b) at least one separation device for removing at least a portion of the solvent from the synthetic resin material; and (c) at least one carbon dioxide vessel including therein a quantity of liquid or supercritical carbon dioxide for contacting with the synthetic resin material and removing at least a portion of the solvent remaining on the synthetic resin material.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
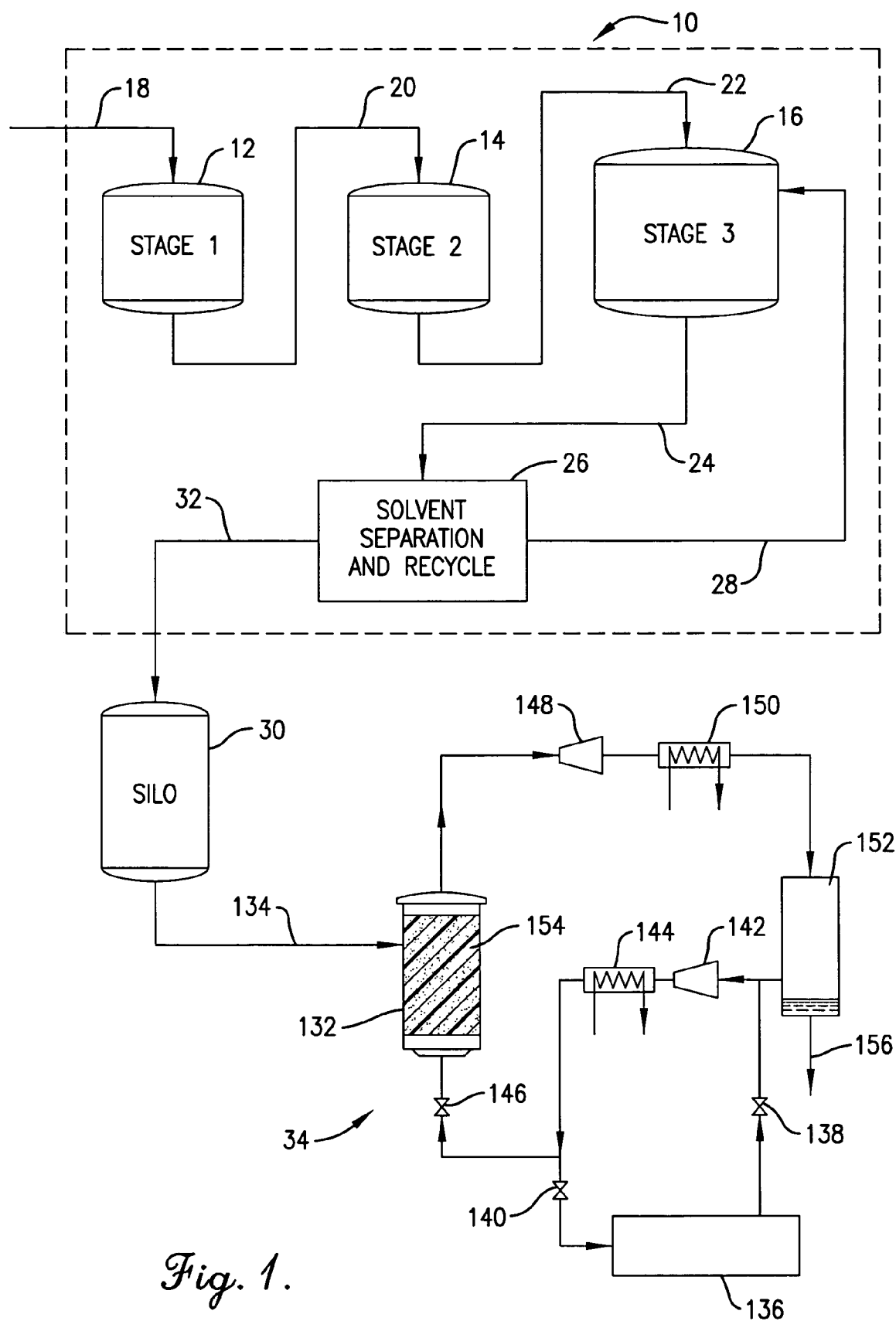
FIG. 1 is a schematic flow diagram depicting a three-stage solvent system and a liquid or supercritical carbon dioxide system for removing contaminants from particulate synthetic resin material.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIG. 1, a process for removing contaminants from post-consumer containers made from synthetic resin material in accordance with a preferred embodiment of the invention is illustrated. The present invention is particularly useful in the removal of oil from high density polyethylene containers, pesticides from HDPE containers, milk from HDPE containers, "soda water" from polyethylene terephthalate containers, polychlorinated biphenyl (PCB) contaminants particularly from automotive plastics, and contaminants from various other post-consumer containers, such as detergent containers, collected from curbside recycling programs. Also, the present system is highly effective in removing labels and label adhesive from synthetic resin material containers. Furthermore, the present invention facilitates contaminant recovery from synthetic resin materials thereby enabling the contaminants to be disposed of in a safe and environmentally friendly manner.

The upstream portion of the process comprises a liquid solvent cleaning system 10. Solvent cleaning system generally includes three separate cleaning stages 12, 14, and 16. Particulate synthetic resin material (illustrated as feed stream 18) is initially loaded into the first stage 12 which contains a liquid solvent. After a first cleaning cycle during which the particulate material is vigorously mixed with the solvent, the particulate material (illustrated as stream 20) is transferred to a second stage 14. Stage 14 operates in a very similar manner to stage 12 in that the particulate material is mixed with additional quantities of solvent. After the second cleaning cycle, the particulate material (illustrated as stream 22) is transferred to a third cleaning stage 16. The third stage 16 also is similar in operation to the first two stages 12, 14. However, for reasons explained in greater detail below, this stage preferably employs a greater quantity of solvent than either of the first two stages. Also, the solvent purity preferably increases from stage 12 to stage 14 to stage 16 The solvent contained in each successive stage is preferably cleaner than the previous stage in order to achieve the maximum solvation of the contaminants present on the synthetic resin material.

It will be appreciated that the stages 12, 14, and 16 do not necessarily need to be carried out in separate vessels. It is believed that the overall process functions most efficiently when these stages are carried out in separate vessels arranged in series, as a nearly continuous process can be achieved. However, it is possible that fewer than three separate vessels could be used and instead of the resin material being transferred from tank to tank, different batches of solvent (having different purities) may be moved in and out of the tank during each stage. In such manner, the particulate synthetic resin material is still contacted by three different batches of solvent, but need not leave the confines of a single vessel.

The particulate material (illustrated as stream 24) is then sent to a solvent separation and recycle station 26. At station 26, a substantial portion of the solvent is separated from the particulate material and recycled to the third cleaning stage 16 via conduit 28. Station 26 preferably employs a device, such as a spin dryer, to mechanically separate the solvent from the particulate material. The particulate material is then sent to a silo 30 via stream 32 to await further processing.

The downstream portion of the process comprises a carbon dioxide cleaning system 34. The setup of system 34 is nearly the same as that disclosed in U.S. Pat. No. 5,711,820, which is incorporated by reference herein. The objective of carbon dioxide system 34 in the context of the present invention is slightly different than in the '820 patent. In the present process, a substantial portion, and preferably almost all, of the contaminants are removed from the synthetic resin material prior to reaching carbon dioxide system 34. However, what remains on the synthetic resin material, in addition to trace amounts of contaminants, is mainly solvent from solvent cleaning system 10. At this stage, the synthetic resin flakes may still comprise between 0.1-5% by weight solvent which must be removed. Carbon dioxide system 34 is used to remove this solvent that is left over from solvent cleaning system 10. Unlike the process shown in the '820 patent, the present carbon dioxide system 34 is not principally directed toward removing oil contaminants from the synthetic resin flakes, but instead is directed toward removing residual solvent from the earlier system. Small amounts of contaminants may still be removed from the flakes during operation of carbon dioxide system 34, however, this is an incidental benefit as the vast majority of the contaminants have already been removed during the solvent cleaning system 10.

Preferably, the solvent used in solvent cleaning system 10 is relatively soluble in liquid or supercritical carbon dioxide (more so than the contaminants being removed from the synthetic resin material in system 10). Therefore, one advantage of the present system is that carbon dioxide system 34 can operate at lower pressures than if carbon dioxide system 34 were directly solvating the contaminants. Operation at lower pressures tremendously lowers equipment costs and energy costs associated with liquefying the carbon dioxide.

As indicated by the dashed line, system 10 is preferably a closed system employing vessels that are sealed or blanketed with an inert gas such as nitrogen to prevent volatilization and escape of solvent to the outside environment. In addition, silo 30 is preferably a closed vessel and does not permit much if any residual solvent adhered to the synthetic resin particles to escape to the environment. As a closed system, system 10 does not present significant environmental concerns as it is relatively self-contained and does not produce significant emissions. Also, the closed nature of system 10 allows for recycling of a substantial portion of the liquid solvent used therein with low make up demands. These features result in a reduction in operating costs of approximately 40% compared to conventional water-based contaminant removal systems and also avoids having to deal with the clean up of contaminated water.

Figure 2:
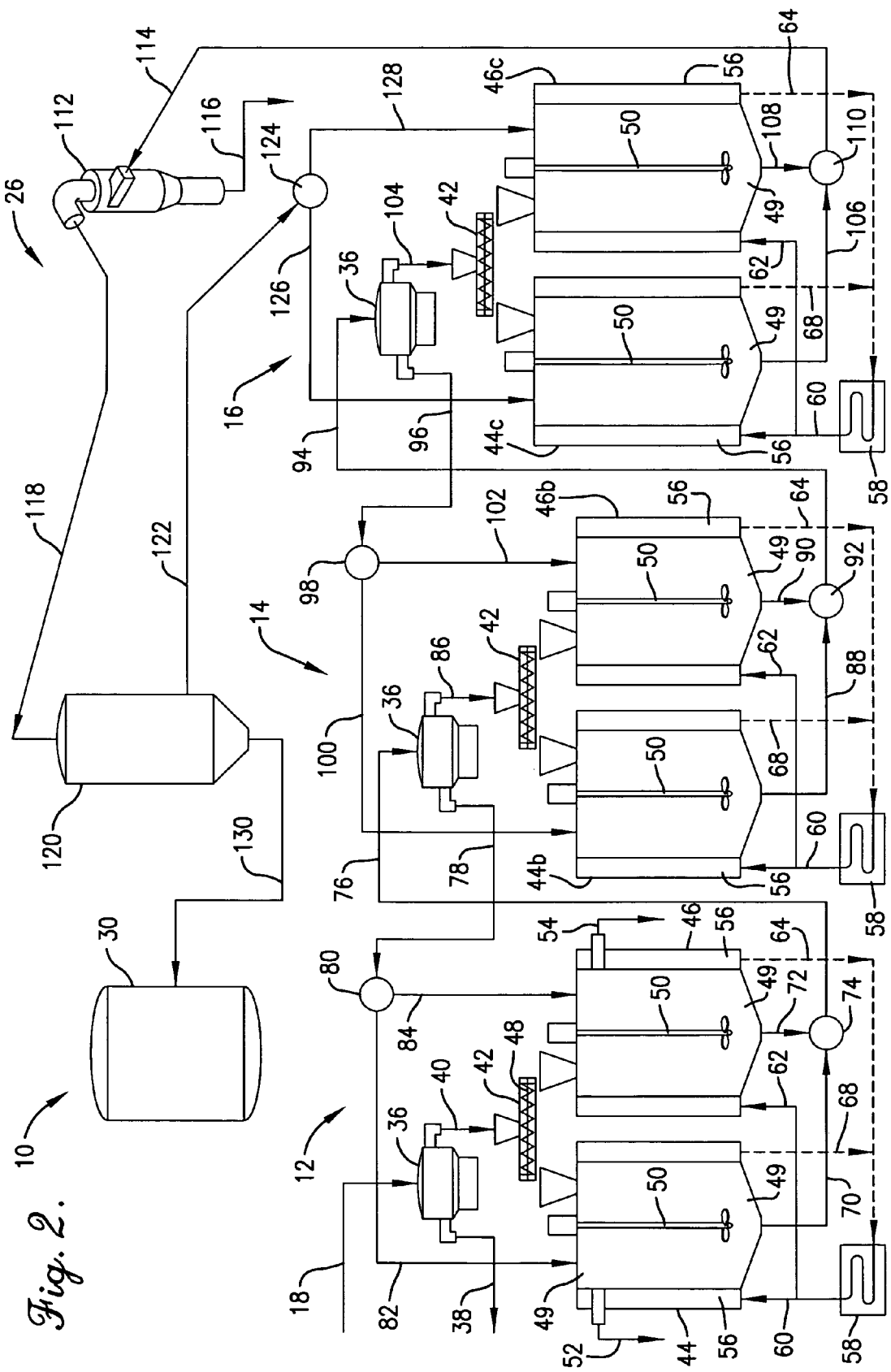
FIG. 2 is a detailed view of the three-stage solvent system shown in FIG. 1.

Turning now to FIG. 2, the solvent cleaning system 10 is shown in greater detail. Stages 12, 14 and 16 are relatively similar with the possible exception of equipment sizing. Therefore, those features common to all three stages are described using the same reference numerals. A feed stream 18 of particulate material ground into approximately ⅜" flakes enters stage 12 and is directed initially to a separator 36 primarily for separation of unacceptably large particles of synthetic resin material that could be difficult to process. The separator can be any sieve or filter-type apparatus suitable for performing this separation, however, apparatus such as a Sweco separator is preferred. The rejected particles exit separator 36 through stream 38 and may be returned to a shredding or grinding device (not shown) for further processing to reach an acceptable size (approximately ⅜").

Synthetic resin particles of acceptable size exit separator 36 thorugh stream 40 and are directed toward a conveyer 42 for distribution to either of cleaning tanks 44 or 46. Conveyer 42 comprises a reversable auger 48 that is capable of directing the particulate synthetic resin material to both tanks 44 and 46. In operation, material is loaded into one tank until its capacity has been reached. The cleaning cycle is begun in that tank and auger 48 reverses direction so as to begin filling the other tank. By providing two tanks in parallel, a nearly continuous process may be achieved.

Tanks 44 and 46 (and all such related tanks) are preferably double-walled tanks, the inner compartments 49 of which contain a liquid solvent capable of dissolving contaminants that may be present on the synthetic resin material. This double-wall feature provides extra protection against accidental release of solvent and contaminants.

A feature unique to tanks 44 and 46 is that these tanks are equipped for separation of less dense synthetic resin material from more dense material. For example, many synthetic resin material containers made from polyethylene terephthalate (PET) employ caps made from less dense polypropylene material. It is often desirable to separate these two kinds of materials during recycling operations. Manual separation of these different materials can be very costly. The present invention accomplishes this separation through the careful selection of a solvent that has a specific gravity in between the specific gravities of the two kinds of materials. Therefore, the less dense polypropylene material will float in the solvent while the more dense PET tends to sink. A skimming device may be used to remove the lesser dense material from tanks 44 and 46 via streams 52 and 54, respectively. Alternatively, gates located proximate the top of tanks 44 and 46 open thereby draining the lesser dense material along with a quantity of solvent which is then filtered and the solvent returned to the respective tank. In some instances, the desired synthetic resin material may have a density that is too close to that of the cap material to facilitate floatation separation. It is then desirable to separate the caps from the containers prior to grinding of the containers.

Each of tanks 44 and 46 is equipped with a mixer 50 for agitating the contents of the tank. Preferably, this agitation is quite significant and can be characterized as violent so as to insure the maximum possible contact of the synthetic resin material with the solvent. A preferred mixer 50 for use with the present system is a Neptune mixer having at least one propeller attached to the mixer shaft.

As previously stated, tanks 44 and 46 are jacketed. The outer compartment 56 of each tank contains a heat transfer fluid for heating and maintaining the temperature of the solvent within the inner compartment 49. Preferably, any suitable heat transfer fluid may be used, however, a glycol such as propylene glycol or ethylene glycol is particularly preferred. The heat transfer fluid is preferably heated to a temperature of between about 170-190° F. using heat exchanger 58. Consequently, the solvent contained within the inner compartment 49 will also be heated to a temperature between about 170-190° F. Using a jacketed vessel to heat the solvent allows heating to be accomplished without use of an open flame near the solvent vessel. This feature adds to the overall safety of the system. The glycol solution is constantly circulated between tanks 44 and 46 and heat exchanger 50 via conduits 60, 62, 64, and 68.

The synthetic resin particles and solvent are agitated for a predetermined length of time. This length of time is dependant upon many factors such as tank size, solvent purity, and the nature of the solvent itself and its capacity for solubilizing the particular contaminants. However, it is preferable for agitation to occur over a relatively short time period, preferably less than 15 minutes, more preferably between 1-12 minutes, and most preferably between about 4-5 minutes. At the end of the agitation cycle, the contents of either tank 44 or 46 are emptied via conduit 70 or 72, respectively. The slurry comprising solvent and synthetic resin material is then pumped by pump 74 and directed to stage 14 via conduit 76.

The slurry passes through a second separator 36 whereby the particulate material is separated from the solvent which is then recycled back to stage 12 via conduit 78. Pump 80 directs the recycled solvent to either tank 44 or 46 via conduits 82 or 84, respectively. The synthetic resin material (illustrated as stream 86) is directed to a second conveyer 42 which distributes the particulate material between tanks 44*b* and 46*b*. Stage 14 then operates in a similar manner to stage 12 with the exception of the extra step of separating synthetic resin materials of different densities by flotation removal.

At the completion of the agitation cycle, the slurry of solvent and particulate material exits the respective tank through conduit 88 or 90 and is pumped by pump 92 to stage 16 via conduit 94. Stage 16 begins with the slurry being passed through a third separator 36 with the solvent being separated and recycled back to stage 14 through conduit 96. Pump 98 directs the recycled solvent back to the appropriate tank through either conduit 100 or 102.

The synthetic resin material leaves separator 36 as stream 104 and is directed to conveyer 42 for distribution between tanks 44c and 46c. Stage 16 then operates in a manner that is similar to the operation of stages 12 and 14. At the completion of the agitation cycle, the solvent and synthetic resin material slurry exits tanks 44c and 46c via conduits 106 and 108, respectively, and is pumped by pump 110 to hydro cyclone 112 via conduit 114.

The hydro cyclone 112 separates solid waste material present in the slurry from the particulate synthetic resin material. The solid waste could be any undesirable particulate material present in the slurry including metal particles and other heavy solid particles that heretofore may have not been separated from the synthetic resin material or solvent. This waste then exits the system as stream 116. The ratio of solvent to synthetic resin material present in the slurry entering the hydro cyclone is dependent upon a number of factors such as the density of the synthetic resin material. Furthermore, the interior of the hydro cyclone must be changed out depending upon the different types of synthetic resin material present in the slurry.

The slurry is directed through conduit 118 toward spin dryer 120 where a substantial portion of the solvent is separated from the synthetic resin material and recycled back to stage 16 through conduit 122 and pump 124. The recycled solvent is then distributed between tanks 44c and 46c through conduits 126 and 128. Spin dryer 120 preferably removes at least about 90% by weight of the solvent present in the slurry, more preferably at least about 95% by weight of the solvent, and most preferably at least about 98% by weight of the solvent. After exiting the spin dryer, the particulate synthetic resin material is transported as stream 130 to storage silo 30 where it is held until it can be sent to carbon dioxide system 34.

The solvent used in system 10 is carefully selected based on various desirable characteristics. First, the solvent should be capable of solvating a number of different kinds of contaminants without causing significant break down of the synthetic resin materials dispersed therein. Second, the solvent should exhibit a specific gravity to facilitate flotation separation of synthetic resin materials of different densities. Using the polypropylene cap and PET container example, it is desirable to separate the cap material from the more valuable PET. The polypropylene material exhibits a specific gravity of about 0.90 whereas PET generally exhibits a specific gravity of between about 1.3-1.4. Preferably, the solvent will have a specific gravity in between these two figures and more preferably will have a specific gravity proximate to that of water. If flotation separation is not a critical feature of the particular process, the specific gravity of the solvent is not as critical a factor. However, it is preferable for the solvent to comprise an organic solvent other than carbon dioxide having a specific gravity (preferably at 20° C.) of at least about 0.76, more preferably between about 0.9-1.5, and most preferably between about 0.95-1.25.

Suitable solvents may be selected from various classes of chemicals such as esters, ketones, glycols, glycol ethers, halogenated solvents, aromatics, alcohols, aliphatic hydrocarbons, amines, and terpenes. More specifically, the solvent is selected from the group consisting of amyl propionate, butyl butyrate, alkyl lactates, ethyl hexyl acetate, dibasic esters, methyl soyate, ethyl soyate, cyclohexanone, methyl ethyl ketone, dipropylene glycol, dipropylene glycol methyl ether, trichloroethylene, xylene, ethanol, tetrahydrofurfuryl alcohol, hexane, mineral spirits, monoethanolamine, d-limonene, dimethyl formamide, n-methyl pyrrolidone, propylene carbonate, and combinations thereof. Preferably, the solvent is an alkyl ester solvent having the general formula RCOOR', wherein R and R' are independently selected from C1-C10 alkyl groups and R contains at least one hydroxyl group. Alkyl lactates are particularly preferred solvents for use with the present invention.

Preferred alkyl lactates include methyl lactate, ethyl lactate, isopropyl lactate, and butyl lactate, all of which are available under the name PURASOLV by PURAC America, Inc., Lincolnshire, Ill. Of the alkyl lactates, ethyl lactate is particularly preferred. These solvents exhibit specific gravities at 20° C. of between 0.98-1.09, are generally miscible with water, and have a high capacity for solvating various organic contaminants such as grease and oil. Furthermore, these solvents are relatively non-toxic and, in some instances, have been approved by the FDA for food applications. The lack of solvent toxicity is an added benefit and contributes to the environmentally friendly nature of this system.

Solvent compatibility with the synthetic resin material is also an important property as it is undesirable for the solvent to solvate the synthetic resin material in addition to the contaminants. Synthetic resin material such as polypropylene, polyethylene, polyethylene terephthalate, nylon, polytetrafluoroethylene, polytetrafluoroethylene, polyvinylidene fluoride, polycarbonate, fluorinated ethylene propylene, polybutylene terephthalate, polyimide, polyetherketone, polyetherimide, polybutylene, polyphenylene oxide, polystryene, polysulfone, polyethersulfone, polymethylpentene, polyvinyl chloride, acetal, acrylic, acrylonitrile-butadiene-styrene (ABS), and combinations thereof, are considered to be compatible with many of the preferred solvents according to the present invention.

Carbon dioxide system 34, as shown in FIG. 1, is an exemplary closed loop separation system suitable for separation of residual solvent adhered to the synthetic resin particles after treatment in solvent system 12. Carbon dioxide system 34 is also capable of removing trace amounts of contaminants that may still be present on the synthetic resin particles; however, the primary function of system 34 is to separate the solvent residue from the particles thereby producing solvent and contaminant free material.

The particulate synthetic resin material is transferred from storage silo 30 to extraction vessel 132 via stream 134 (preferably an auger transport device). Typically, the material will be enclosed in a steel mesh basket or other porous metal enclosure so that the synthetic resin material will not be swept out of the extraction vessel 132 into other portions of the separation system 34 by the flowing carbon dioxide described below. The system is then filled with carbon dioxide from a reservoir 136 through a control valve 138 to a pressure suitable to satisfy the desired pressure and temperature conditions in operation as described further below. With the control valves 138 and 140 shut off, carbon dioxide flow is established from the compressor 142 and associated heat exchanger 144 through control valve 146, through the extraction vessel 132, through the expansion device 148 and associated heat exchanger 150, through separation vessel 152 and to the compressor 142 for another cycle. Adjustments to the compressor 142 speed, expansion device 148, and the temperature of the heat exchangers 144 and 150 allows the extraction vessel 132 and separation vessel 152 to be maintained at the desired pressures and temperatures as described further below. Such adjustments may be made manually or controlled by commercially-available computer software and equipment. Overall charge of the system may be adjusted by admitting more carbon dioxide from reservoir 136 through control valve 138 or by discharging carbon dioxide to the reservoir through control valve 140.

In the extraction vessel 132, the desired temperature and pressure for solvency of the solvent in liquid or supercritical carbon dioxide is typically from about 600-5000 psia (more preferably from 650-1000 psia, and most preferably from about 700-800 psia) and from about 20-100° C. (more preferably from about 30-90° C., and most preferably from about 60-70° C.). The solvent-free liquid or supercritical carbon dioxide continuously enters the bottom of the extraction vessel 132 and flows upward past the synthetic resin material 154, dissolving the solvent carried on the material 154 (from system 10) and flushing it away. It is of some importance that the flow of carbon dioxide be introduced to the bottom of extraction vessel 132, since the upward flow will tend to fluidize the bed of synthetic resin material 154 and hasten dissolution of the solvent.

The solvent-laden carbon dioxide continuously exits from the top of extraction vessel 132 and flows to the expansion device 148 and heat exchanger 150. Expansion device 148 and heat exchanger 150 are set such that the carbon dioxide entering the separator vessel 152 is in the gaseous phase; typically from about 400-1000 psia and from about 20-35° C. Under these gaseous conditions, the carbon dioxide has negligible solubility for the solvent, and therefore the solvent (including any trace amounts of contaminants) is precipitated out of solution, forming a two-phase system of liquid solvent and gaseous carbon dioxide, and the solvent collects in the bottom of separator vessel 152. The now solvent-free carbon dioxide gas is compressed through the compressor 142 wherein the pressure is raised equal to or greater than that of the extraction vessel 132. The temperature of the carbon dioxide then is adjusted to the desired value as it flows through heat exchanger 144, from where it reenters the extraction vessel 132 as either liquid or supercritical (depending on the pressure and temperature chosen) carbon dioxide to again dissolve and flush away solvent from the synthetic resin material 154. This recirculation of the carbon dioxide is continued until all of the solvent has been removed from the synthetic resin material and deposited in the separator vessel 152.

When the separation of the solvent from the synthetic resin material is complete, with control valve 146 closed, the clean carbon dioxide is routed into the storage reservoir 136 through control valve 140 to be used again later. The solvent-free synthetic resin material 154 is removed from the extraction vessel 132 (preferably by a vacuum system) and sent to a storage silo. The solvent 156 recovered is drained from the separator vessel 152. The only waste released by this process is the small amount of carbon dioxide gas vented during final depressurization of the extraction vessel 132.

An aspirator may be used to separate the flakes of synthetic resin material from bits of label paper or other light material present in the solvent-free product. The flakes are then sent to another storage silo to await packaging.

The solvent 156 recovered by carbon dioxide system 34 is preferably recycled to solvent cleaning system 10, or if necessary, may be sent to a purification system. Periodically, the solvent used in stages 12, 14, and 16 will need to be changed out and purified as the solvent becomes saturated with contaminants. The time period between these change outs is dependent upon a number of factors including the stage in which the solvent is being used and the solvent's capacity or solvating power (sometime referred to as the Kauri butanol value), but is typically every several hours. The solvent is drained from the respective stage and sent to a distillation system for separation of the solvent and the contaminants. The operating conditions for the distillation system depend largely upon the flash point of the solvent, but preferred solvents according to the present invention are typically heated to about 300° F. and then re-condensed. The contaminant waste is then properly disposed or recycled. Recovery of the contaminant waste for proper disposal is an important advantage of the present invention. If the contaminants were not recovered, particularly the more toxic contaminants, they would likely wind up in a landfill along with the synthetic resin material where they could cause soil and groundwater contamination.

The solvent stages 12, 14, and 16 need not be taken off-line for substantial periods of time during this process as fresh solvent can be added immediately following removal of the "dirty solvent" and the process continued while the dirty solvent is being purified. System 10 as shown in FIG. 2 is particularly designed to avoid this downtime as tanks 44 and 46 are situated in parallel, so that one tank is operational while the other is taken down for solvent change over. In essence, the system 10 is designed to function as a continuous-batch process.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

The invention claimed is:

1. A method for removing contaminants from synthetic resin material comprising contacting particulate synthetic resin material containing at least one contaminant with an alkyl lactate solvent in a vessel, at least a portion of said at least one contaminant being removed from said particulate synthetic resin material and becoming dissolved in said solvent.

2. The method of claim 1 wherein said synthetic resin material is selected from the group consisting of polypropylene, polyethylene, polyethylene terephthalate, nylon, polytetrafluoroethylene, polytetrafluoroethylene, polyvinylidene fluoride, polycarbonate, fluorinated ethylene propylene, polybutylene terephthalate, polyimide, polyetherketone, polyetherimide, polybutylene, polyphenylene oxide, polystyrene, polysulfone, polyethersulfone, polymethethylpentene, polyvinyl chloride, acetal, acrylic, ABS, and combinations thereof.

3. The method of claim 1 wherein said alkyl lactate is selected from the group consisting of methyl lactate, ethyl lactate, isopropyl lactate, butyl lactate and combinations thereof.

4. The method of claim 1 wherein said contacting step comprises sequentially contacting said particulate synthetic resin material with said solvent in at least two separate stages.

5. The method of claim 4 wherein said contacting step comprises sequentially contacting said particulate synthetic resin material in three separate stages.

6. The method of claim 1 including the step of removing at least a portion of said solvent from said particulate synthetic resin material.

7. The method of claim 6 wherein said solvent removal step includes passing said particulate synthetic resin material through a hydrocyclone followed by a dryer.

8. The method of claim 1 wherein said particulate synthetic resin material comprises particles of different densities and said contacting step includes separating the more dense synthetic resin particles from the less dense synthetic resin particles by floatation of said less dense synthetic resin particles in said solvent.

9. A method for removing contaminants from synthetic resin material comprising the steps of:
(a) contacting particulate synthetic resin material containing at least one contaminant with a solvent other than carbon dioxide, at least a portion of said contaminant being removed from said particulate synthetic resin material and becoming dispersed in said solvent;
(b) removing at least a portion of said solvent from said particulate synthetic resin material; and
(c) contacting said particulate synthetic resin material with liquid carbon dioxide, at least a portion of said solvent not removed in step (b) being removed from said particulate synthetic resin material and becoming dissolved in said carbon dioxide.

10. The method of claim 9 wherein said synthetic resin material is selected from the group consisting of polypropylene, polyethylene, polyethylene terephthalate, nylon, polytetrafluoroethylene, polytetrafluoroethylene, polyvinylidene fluoride, polycarbonate, fluorinated ethylene propylene, polybutylene terephthalate, polyimide, polyetherketone, polyetherimide, polybutylene, polyphenylene oxide, polystyrene, polysulfone, polyethersulfone, polymethylpentene, polyvinyl chloride, acetal, acrylic, ABS, and combinations thereof.

11. The method of claim 9 wherein said solvent is selected from the group consisting of alkyl lactates, ethyl hexyl acetate, dibasic esters, methyl soyate, ethyl soyate, cyclohexanone, methyl ethyl ketone, dipropylene glycol, dipropylene glycol methyl ether, trichloroethylene, xylene, ethanol, tetrahydrofurfuryl alcohol, hexane, mineral spirits, monoethanolamine, d-limonene, dimethyl formamide, n-methyl pyrrolidone, propylene carbonate, and combinations thereof.

12. The method of claim 11 wherein said alkyl lactate selected from the group consisting of methyl lactate, ethyl lactate, isopropyl lactate, butyl lactate and combinations thereof.

13. The method of claim 9 wherein step (a) comprises sequentially contacting said particulate synthetic resin material with said solvent in at least two separate stages.

14. The method of claim 13 wherein step (a) comprises sequentially contacting said particulate synthetic resin material in three separate stages.

15. The method of claim 9 wherein said solvent removal step comprises passing said particulate synthetic resin material through a hydrocyclone followed by a dryer.

16. The method of claim 9 further including:
(d) separating said carbon dioxide from said particulate synthetic resin material followed by separating said solvent removed in step (c) from said carbon dioxide.

17. The method of claim 16 further including:
(e) purifying said solvent separated from said carbon dioxide in step (d) and recycling said purified solvent to step (a).

18. A system for removing contaminants from synthetic resin material comprising:
(a) at least one solvent vessel including therein a quantity of a liquid solvent other than carbon dioxide for contacting with said synthetic resin material;
(b) at least one mechanical separation device for removing at least a portion of said solvent from said synthetic resin material; and
(c) at least one carbon dioxide vessel including therein a quantity of liquid carbon dioxide for contacting said synthetic resin material and removing at least a portion of said solvent remaining on said synthetic resin material.

19. The system of claim 18 further including
(d) transport apparatus for transferring said synthetic resin material from said separation device to said carbon dioxide vessel.

20. The system of claim 18 wherein said at least one solvent vessel comprises an inner tank containing said solvent, an outer tank, and a space therebetween, said space containing a heat transfer fluid for controlling the temperature of the solvent within said inner tank.

21. The system of claim 18 wherein said heat transfer fluid comprising a glycol.

22. A method for removing contaminants from synthetic resin material comprising the steps of:
(a) contacting particulate synthetic resin material containing at least one contaminant with a liquid consisting essentially of a solvent other than carbon dioxide, at least a portion of said contaminant being removed from said particulate synthetic resin material and becoming dispersed in said liquid;
(b) removing at least a portion of said solvent from said particulate synthetic resin material; and
(c) contacting said particulate synthetic resin material with liquid or supercritical carbon dioxide, at least a portion of said solvent not removed in step (b) being removed from said particulate synthetic resin material and becoming dissolved in said carbon dioxide.

23. The system of claim 19 wherein said transport apparatus includes a storatge silo and conduit connecting said silo to said carbon dioxide vessel.

24. The system of claim 18 where said solvent is selected from the group consisting of amyl propionate, butyl butyrate, alkyl lactates, ethyl hexyl acetate, dibasic esters, methyl soyate, ethyl soyate, cyclohexanone, methyl ethyl ketone, dipropylene glycol, dipropylene glycol methyl ether, trichloroethylene, xylene, ethanol, tetrahydrofurfuryl, hexane, mineral spiritsm monoethanolamine, d-limonene, dimethyl formamide, n-methyl pyrrolidone, propylene carbonate, and combinations thereof.

25. The system of claim 24 wherein said solvent is an alkyl lactate solvent selected from the group consisting of methyl lactate, ethyl lactate, isopropyl lactate, butyl lactate and combinations thereof.

26. the system of claim 18 wherein said separation device comprises a spin dryer.

27. The system of claim 18 wherein said system includes at least three separate solvent vessels arranged in series.

28. The system of claim 27 wherein each of said solvent vessels includes a mechanical agitator for effecting mixing between said solvent and said synthesis resin material.

29. the system of claim 27 wherein the first of said at least three solvent vessels includes apparatus for removal of floating synthetic resin material from said first vessel.

* * * * *